(12) United States Patent
Merom et al.

(10) Patent No.: US 9,363,135 B1
(45) Date of Patent: Jun. 7, 2016

(54) SOCIAL VICINITY SERVICE FOR SOCIAL NETWORKS

(75) Inventors: Ron Merom, Qiryat Bialik (IL); Naty Leiser, Haifa (IL); Eyal Molad, Holon (IL); Ari Berger, Zichron Yaakov (IL); Tzvi Itzhak Barenholz, Raanana (IL); Eran Timor, Haifa (IL); Sigalit Bar, Haifa (IL); Ari J. Leichtberg, Zichron Yaakov (IL)

(73) Assignee: Google Inc., Mountain View, CA (US)

( * ) Notice: Subject to any disclaimer, the term of this patent is extended or adjusted under 35 U.S.C. 154(b) by 567 days.

(21) Appl. No.: 13/238,089

(22) Filed: Sep. 21, 2011

(51) Int. Cl.
*G06F 15/16* (2006.01)
*H04L 29/08* (2006.01)
*H04L 29/06* (2006.01)

(52) U.S. Cl.
CPC .......... *H04L 29/08072* (2013.01); *H04L 29/06* (2013.01)

(58) Field of Classification Search
CPC ................................ G06F 17/60; H04L 51/32
USPC .......................................... 709/206, 216, 217
See application file for complete search history.

(56) References Cited

U.S. PATENT DOCUMENTS

| | | | |
|---|---|---|---|
| 2005/0159998 A1* | 7/2005 | Buyukkokten et al. | 705/11 |
| 2005/0216300 A1* | 9/2005 | Appelman et al. | 705/1 |
| 2006/0218111 A1* | 9/2006 | Cohen | 706/45 |
| 2008/0316925 A1* | 12/2008 | Dolin et al. | 370/232 |
| 2009/0319288 A1 | 12/2009 | Slaney et al. | |
| 2011/0035789 A1 | 2/2011 | Callahan et al. | |
| 2011/0289011 A1* | 11/2011 | Hull et al. | 705/319 |
| 2013/0318085 A1 | 11/2013 | Pepper | |

OTHER PUBLICATIONS

Maayan Roth et al., U.S. Appl. No. 12/762,081, entitled "Generating Contact Suggestions," filed Apr. 16, 2010, 38 pages (including specification, claims, abstract and drawings).
Thebubba, "FAQ Question #163: How do I find a syndicated account?," LiveJournal, Jan. 6, 2004, 2 pages.
Ina O'Murchu et al., "Online Social and Business Networking Communities," DERI Technical Report Aug. 11, 2004 DERI—Digital Enterprise Research Institute, Aug. 2004, 22 pages.
Marco Neumann et al., "Semantic Social Network Portal for Collaborative Online Communities," Journal of European Industrial Training, vol. 29, No. 6, Jan. 2005, pp. 472-487.
Nathan Eagle et al., "Social Serendipity: Proximity Sensing and Cueing," MIT Media Laboratory Technical Note 580, May 2004, 18 pages.
Ronald van Eijk et al., "We-centric, context-aware, adaptive mobile service bundles," Telematica Instituut, Freeband Frux D1.1, Nov. 30, 2004, 48 pages.

(Continued)

*Primary Examiner* — David Lazaro
*Assistant Examiner* — Zia Khurshid
(74) *Attorney, Agent, or Firm* — Fish & Richardson P.C.

(57) ABSTRACT

Methods, systems, and apparatus, including computer programs encoded on a computer storage medium, for receiving an identifier associated with a user of a social networking service, identifying one or more first services provided by a first service provider, determining that the user is a user of the one or more first services based on the identifier, identifying first contacts of the user within each of the one or more first services, and generating a social vicinity index based on the first contacts, the social vicinity index including one or more potential contacts for the user within the social networking service.

18 Claims, 5 Drawing Sheets

(56) References Cited

OTHER PUBLICATIONS

Marc Steen et al., "Development of we-centric, context-aware, adaptive mobile services requires empathy and dialogue," Freeband Frux, 2005, 4 pages.

Junichiro Mod et al., "Real-world Oriented Information Sharing Using Social Networks," Proceedings of the 2005 International ACM SIGGROUP Conference on Supporting Group Work (Group 05), Nov. 6-9, 2005, pp. 81-84.

Alice Emily Marwick, "Selling Your Self: Online Identity in the Age of a Commodified Internet," Thesis for degree of Master of Arts, University of Washington, 2005, 192 pages.

Tracy Cohen et al., "Social Networks for Creative Collaboration," Proceedings of the 5th Conference on Creativity & Cognition (C&C'05), Apr. 12-15, 2005, London United Kingdom, pp. 252-255.

Sara Metcalf et al., "Spatial Dynamics of Social Network Evolution," Proceedings of the 23rd International Conference of the System Dynamics Society, Jul. 19, 2005, 13 pages.

* cited by examiner

SOCIAL VICINITY SERVICE FOR SOCIAL NETWORKS

BACKGROUND

This specification generally relates to suggesting potential contacts to users of a social networking service.

SUMMARY

In general, innovative aspects of the subject matter described in this disclosure may be embodied in methods that include the actions of receiving an identifier associated with a user of a social networking service, identifying one or more first services provided by a first service provider, determining that the user is a user of the one or more first services based on the identifier, identifying first contacts of the user within each of the one or more first services, and generating a social vicinity index based on the first contacts, the social vicinity index including one or more potential contacts for the user within the social networking service.

These and other implementations may each optionally include one or more of the following features. For instance, actions further include receiving one or more scores, each of the one or more scores being associated with a contact of the first contacts, the social vicinity index being generated further based on the one or more scores; each score of the one or more scores includes a social affinity score reflecting an interaction between the user and a first contact; the one or more scores are received from a scoring service; each score of the one or more scores is generated based on interactions of the user and the first contacts using the one or more first services; actions further include: defining a group of first contacts, wherein each contact in the group is associated with a score that is greater than a threshold score, and populating the social vicinity index with the group, where contacts in the group are provided in a rank order based on score; actions further include identifying second contacts of the user based on the first contacts, the social vicinity index being generated further based on the second contacts; the first contacts are direct contacts of the user within the one or more first services; the second contacts are indirect contacts of the user; actions further include receiving one or more scores, each of the one or more scores being associated with a contact of the first contacts and the second contacts, the social vicinity index being generated further based on the one or more scores; actions further include defining a first group of contacts, wherein each contact in the first group of contacts is associated with a score that is greater than a threshold score, the first group of contacts including contacts of the first contacts and contacts of the second contacts, and populating the social vicinity index with the first group of contacts, where contacts in the first group of contacts are provided in a rank order based on score; actions further include defining a second group of contacts, wherein each contact in the second group of contacts is associated with a score that is less than or equal to the threshold score, the second group of contacts including contacts of the first contacts and contacts of the second contacts, and populating the social vicinity index with the second group of contacts, where contacts in the second group of contacts are provided in a rank order based on respective quality scores; the one or more services include at least one of an email service, a document sharing service and an instant messaging (IM) service; the identifier is based on an email address of the user; actions further include: receiving user input, the user input indicating that the user has logged into the social networking service, and, in response to the user input, providing data for displaying graphical representations of each of the one or more potential contacts in a display; and actions further include: generating a social vicinity graph based on the user, services used by the user, and contacts of the user, and merging data provided in the social vicinity graph to provide a consolidated social vicinity graph, the social vicinity index being generated based on the consolidated social vicinity graph.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to suggesting one or more potential contacts to users of a computer-implemented social networking service. In some implementations, a social vicinity service is provided for suggesting potential contacts to a user of a social networking service. In general, the social vicinity service determines relationships between users of one or more services provided by one or more service providers based on data provided from a plurality of data sources. Example services can include Internet search services, email services, instant messaging (IM) services, contact management services and social networking services. Based on relationships between a particular user and other users, one or more of the other users can be suggested to the particular user as a potential contact within the context of a social networking service.

Figure 1:
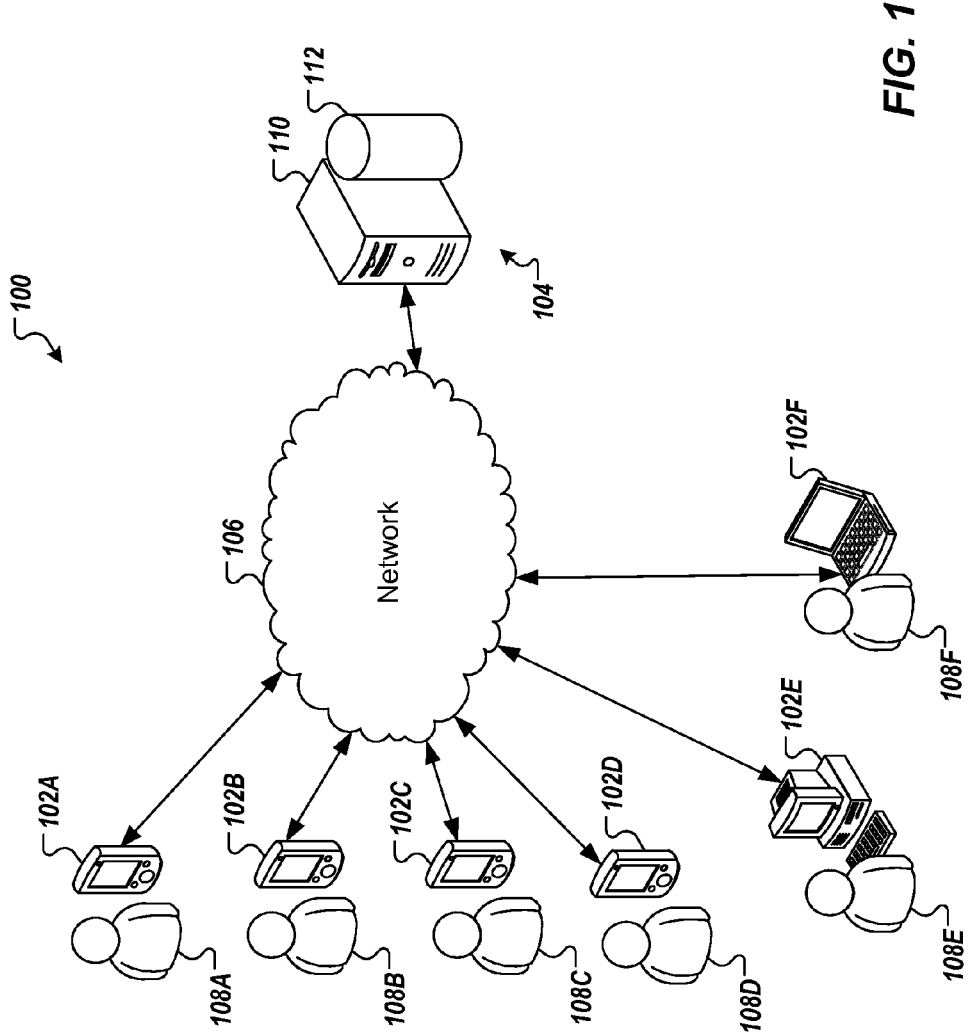
FIG. 1 depicts an example system that can execute implementations of the present disclosure.

FIG. 1 is a diagram of an example network architecture 100. The network architecture 100 includes a number of client devices 102A, 102B, 102C, 102D, 102E, 102F (collectively referenced as client devices 102A-102F) communicably connected to a server system 104 by a network 106. Users 108A, 108B, 108C, 108D, 108E, 108F (collectively referenced as users 108A-108F) can interact with client devices 102A-102F, respectively. The server system 104 includes one or more processing devices 110 and one or more data stores 112. The processing devices 110 execute computer instructions (e.g., program code) stored in the data store 112 to perform functions as discussed herein.

Users 108A-108F of the client devices 102A-102F access the server system 104 to use services provided by one or more service providers. For example, the client devices 102A-102F can execute web browser applications that can be used to access computer-implemented services. In another example, the client devices 102A-102F can execute software applications that are specific to the services. In some examples, services can include Internet search services, email services, instant messaging (IM) services, contact management services and social networking services. In some examples, one or more service providers can provide the services. In some examples, each user can establish an account with respective service providers. A user can log into the account (e.g., using an associated username and password) to access the service. For example, a user can log into a website or an application corresponding to an email service to send and receive email.

In some implementations, the client devices 102A-102F can be computing devices such as laptop or desktop computers, smartphones, personal digital assistants, portable media players, tablet computers, or other appropriate computing devices. In some implementations, the server system 104 can be a single computing device such as a computer server. In some implementations, the server system 104 can represent a plurality of computing devices working together to perform the actions of a server computer (e.g., cloud computing). In some implementations, the network 106 can be a public communication network (e.g., the Internet, cellular data network, dialup modems over a telephone network) or a private communications network (e.g., private LAN, leased lines).

In accordance with implementations of the present disclosure, an example service can include a social networking service. With reference to FIG. 1, a service provider can host the social networking service using the server system 104. One or more users 108A-108F interacting with the client devices 102A-102F can participate in the social networking service. Example interactions can include posting digital content such as text comments (e.g., updates, announcements, replies), digital photos, videos, links or other appropriate electronic information. In some examples, a software application executing on a mobile device, with proper permissions, may use global positioning system (GPS) capabilities to determine the user's location and automatically update the social networking service with the user's location (e.g., "At Home", "At Work", "In Brownsdale, Minn.").

Figure 2:
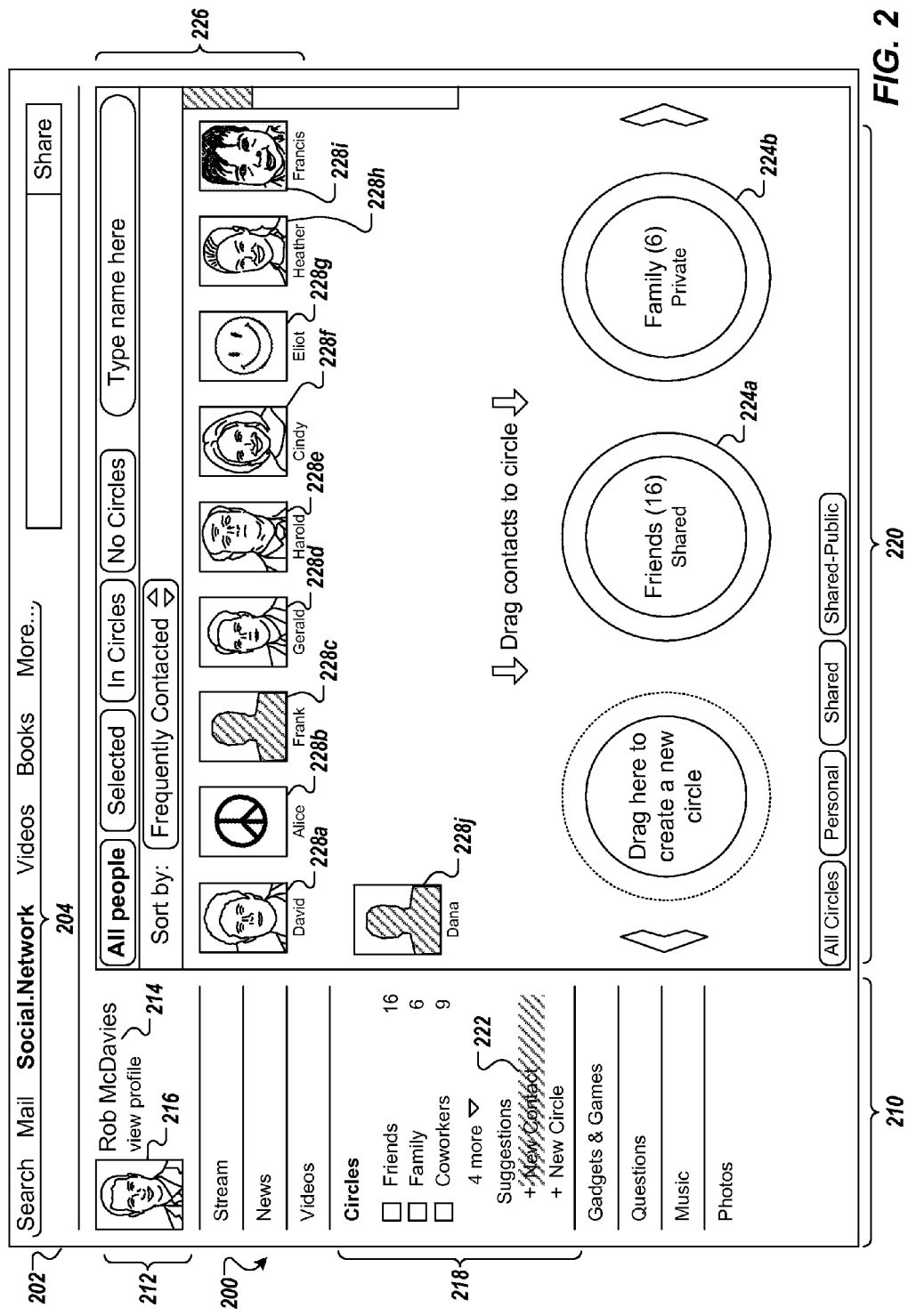
FIG. 2 depicts a screen-shot of an example graphical user interface for interacting with an example social networking service.

FIG. 2 depicts a screen-shot 200 of an example graphical user interface for interacting with an example social networking service. In the screen-shot 200, a social graph editor user interface (UI) 202 is shown. In some implementations, the UI 202 can be the interface presented by a social networking specific application, while in some implementations the UI 202 can be one or more web pages of a social networking website displayed in a general purpose web browser. The UI 202 includes a number of choices presented in a menu bar 204. In the present example, the "Social Network" choice has been selected by a user currently logged into the social networking service (e.g., Rob McDavies, in the depicted example). This selection causes a web-based social networking application to be executed and a social network menu 210 to be displayed. The social network menu 210 includes a profile indicator 212 in which information such as a user name 214 and a user image 216 associated with the currently logged in user are displayed.

The example social networking service enables users to categorize contacts in terms of social circles. In general, social circles are categories to which a user can assign their social networking contacts and better control the distribution and visibility of social networking posts. In some examples, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. A user of the social networking service can define a social circle, and the social circle, as a data set defining a collection of contacts, may reflect a real-life social circle of the user. That is, a social circle can reflect real-life social interactions between persons that the user may directly or indirectly associate with.

The social network menu 210 also displays, among other items, a social circles submenu 218. In the depicted example, a "New Contact" menu item 222 from a sub-menu "Suggestions" is selected (e.g., as represented by the highlighting of the menu item). In response to selection of the menu item 222, potential social networking contacts can be presented to the user within a contact display 226 of a social circle display 220. The contact display 226 provides a graphical interface for viewing, selecting, and organizing a collection of contact icons 228a, 228b, 228c, 228d, 228e, 228f, 228g, 228h, 228i, 228j (collectively referenced as contact icons 228a-228j). In the present example, the contact icons 228a-228j represent potential contacts or other entities (e.g., organizations, places, or other items) that the user can interact with using the social networking service. In some implementations, the icons can be digital photos of the contacts they represent (e.g., the icons 228a, 228d), arbitrary images (e.g., the icons 228b, 228g), or placeholders (e.g., when the contact has no image associated with their account, such as the icon 228c).

The social circle display 220 includes a number of social circles 224a, 224b that are visual representations of various social circles that the user has created or has permission to edit. Each of the social circles 224a, 224b displays information about the social circle it represents. Although the depicted example provides two social circles 224a, 224b, it is appreciated that any number of social circles can be displayed to the user.

In some implementations, the user can add one or more of the displayed potential contacts to a social circle to enable interaction with the contact using the social networking service. In some examples, the user can select a contact icon (e.g., by clicking and holding on the contact icon) and can add the contact icon to a social circle (e.g., by dragging and dropping the contact icon onto a social circle). For example, the contact icon 228a can correspond to a potential contact "David," who is a real-life friend of the user. The user can select the contact icon 228a and can add the contact icon 228a to the "Friends" social circle 224a. Consequently, the potential contact "David" has become an actual contact of the user within the social networking service.

In some examples, the user can use the social circles to distribute digital content to contacts through the social networking service. For example, the user can generate a post to the social networking service. During a post write-time, a post data set is transmitted from the user's client computing device to a distribution hub, which can be provided at a server. The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post). In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store and are transmitted to respective client devices.

In some implementations, a relationship between a user and a contact can be a symmetrical relationship or an asymmetrical relationship. A symmetrical relationship can be provided when the contact is also a user of the social networking service and has added the user as a contact within the social networking service. For example, and with continued reference to FIG. 2, the user "Rob McDavies" can add the potential contact "David" to a social circle, thereby establishing "David" as an actual contact within the context of the social networking service. Independently, "David" can also be a user of the social networking service and can add "Rob McDavies" to a social circle, thereby establishing "Rob McDavies" as an actual contact within the context of the social networking service. In this manner, digital content posted by "Rob McDavies" using the social networking service can be displayed to "David" within the social networking service (e.g., on a post stream page associated with "David"), and digital content posted by "David" using the social networking service can be displayed to "Rob McDavies" within the social networking service (e.g., on a post stream page associated with "Rob McDavies").

An asymmetrical relationship can be provided when the contact is not a user of the social networking service. For example, and with continued reference to FIG. 2, the user "Rob McDavies" can add the potential contact "Alice" to a social circle, thereby establishing "Alice" as an actual contact within the context of the social networking service. In this example, however, "Alice" is not a user of the social networking service, and is instead a contact of "Rob McDavies" via another service (e.g., an email contact via an email service). In this manner, digital content posted by "Rob McDavies" using the social networking service can be conveyed to "Alice" outside of the social networking service (e.g., via an email). In some examples, an asymmetrical relationship can also be provided when the contact is a user of the social networking service, but does not include the user as a contact. For example, and with continued reference to FIG. 2, the user "Rob McDavies" can add the potential contact "Alice" to a social circle, thereby establishing "Alice" as an actual contact within the context of the social networking service. In this example, however, "Alice" is a user of the social networking service, but has not added the user "Rob McDavies" as an actual contact within the social networking service.

Implementations of the present disclosure are directed to a social vicinity service for suggesting potential contacts to a user of a social networking service. In general, the social vicinity service determines relationships between users of one or more services provided by one or more service providers. Example services can include Internet search services, email services, instant messaging (IM) services, contact management services and social networking services. Based on relationships between a particular user and other users, one or more of the other users can be suggested to the particular user as a potential contact within the context of a social networking service. In some implementations, the social vicinity service can be implemented as one or more computer programs executed using one or more computing devices.

In some implementations, a social vicinity graph can be generated for each user and can include contacts of the user within the context of one or more services. The social vicinity graph includes nodes and edges between nodes. Each node can represent a user (e.g., a potential contact) and each edge represents a relationship between users.

In accordance with the present disclosure, the social vicinity graph can be generated based on data provided from one or more data sources. In some examples, a first data source can include service data that provides data indicating one or more services that a first user uses. In some examples, the first user can be identified using a unique identifier within a domain of a service provider. For example, and within the domain of an email service provider, the unique identifier can include the email address of the first user. In some examples, the unique identifier can be used across other domains of the service provider and/or one or more other service providers. For example, the unique identifier can uniquely identify the first user within the domain of an email service provider, a search service provider, a shared documents service provider, an IM service provider, a mapping service provider, and/or a contact management service provider. In some examples, a single service provider can provide each of the example services. In some examples, a plurality of different service providers can provide the example services. In some examples, use of a service can require a user to log in (e.g., email and/or IM services requiring log in using a username and password). In some examples, services can be used without requiring a user to log in (e.g., mapping and/or search services).

Accordingly, data provided from the first data source can indicate one or more services that the first user uses based on the unique identifier associated with the first user. The social vicinity graph for the first user can include a root node that represents the first user.

In some examples, a second data source can include contacts of the first user that have been established through one or more services. In some examples, a contact management service can be provided and can be a sub-service of and/or function in conjunction with another service (e.g., an email service). In some implementations, the contact management service can be an independent service provided by the service provider of the email service or provided by another service provider. The contact management service can maintain contacts, social private circles, imported contacts (e.g., from other services), as well as the name and email address of each. In some examples, the contact management service can store, for each contact, the last time the first user communicated with the contact (e.g., last email sent or received, last IM interaction), the frequency of contact with the first user, and imported contacts from other services (e.g., one or more other email services).

For each contact of the first user (i.e., identified from the second data source), an interaction score is retrieved. In some implementations, a score data source provides the interactions scores. In some examples, the score data source calculates the interaction score between the first user and each contact based on an interaction history between the first user and each contact. In some examples, the interaction score is calculated based on email interactions and/or IM interactions between the first user and each contact. The interactions can be weighted based on type, time and/or frequency. The interactions can be weighted based on particular characteristics of the interaction. For example, an email between the first user and a single contact can be weighted more heavily than an email between the first user and a plurality of contacts. In this manner, an influence of spam emails on the interaction score can be reduced. Each email interaction can be assigned a value and each IM interaction can be assigned a value. Respective weights (e.g., multipliers) can be applied to the values to provide respective weighted values. For example, a first multiplier can be provided based on the interaction type and a second multiplier can be provided based on characteristics of the interaction. The weighted values can be combined (e.g., summed) to provide the interaction score.

Generally, the interaction scores indicate an interaction rank that is based on all interactions of the user and each contact (e.g., email, IM, shared documents). Each interaction is weighted (e.g., discount based on interaction type and discount over time). In some examples, a half-life is used to decay older interactions. For direct, or 1-hop contacts (discussed below) the interactions score provides an interactions rank between the user and a respective contact. For indirect, or 2-hop contacts, the interactions score is mitigated by number of intermediary contacts. For example, the user and a contact are mutual contacts through an intermediary. If intermediary is contacts with a million other users the relationship between the user and the contact is not very meaningful and is correspondingly discounted based on number of friends intermediary (e.g., $\frac{1}{1000000}$ is worse than $\frac{1}{100}$).

In some examples, a third data source can includes other services of the first user and contacts of the first user that have been established through the other services. The other services can be services provided by one or more other service providers than a service provided by the service provider from which the unique identifier is provided. For example, the first data source, discussed above, can provide the unique identifier for the first user and can be maintained by a service provider that provides an email service and an IM service used by the first user. The third data source can indicate other services that are provided by other service providers and that are used by the first user. Example other services can include a blogging service, a micro-blogging service, a social networking service (e.g., a personal social networking service, a professional social networking service). A blogging service can include a blogging website hosted by and/or a blogging-specific computer program application provided by a service provider. A micro-blogging service can include a micro-blogging website hosted by and/or a micro-blogging-specific computer program application provided by a service provider. A personal social networking service can include a social networking website hosted by and/or a social networking-specific computer program application provided by a service provider. Users of a personal social networking service can share information with other users such as friends, family and acquaintances. A professional social networking service can include a social networking website hosted by and/or a social networking-specific computer program application provided by a service provider. Users of a professional social networking service can share information and generally network with other professional contacts.

As discussed in further detail herein, implementations of the social vicinity service merge users from a plurality of data sources into unified user records that can include both public and private data. For each outgoing link of a particular user (e.g., link to a connected service, the link is traversed and all other users that are visible to the particular user through the link are determined. For each particular user, contacts can be merged based on their corresponding social graph node and name matching. For each particular user and contacts of the particular user, the interaction score is retrieved. Contacts can be presented to the particular user within a social networking service as potential contacts for interaction through the social networking service. The potential contacts can be determined and can be presented based on the respective interaction scores, as discussed in further detail herein.

Figure 3A:
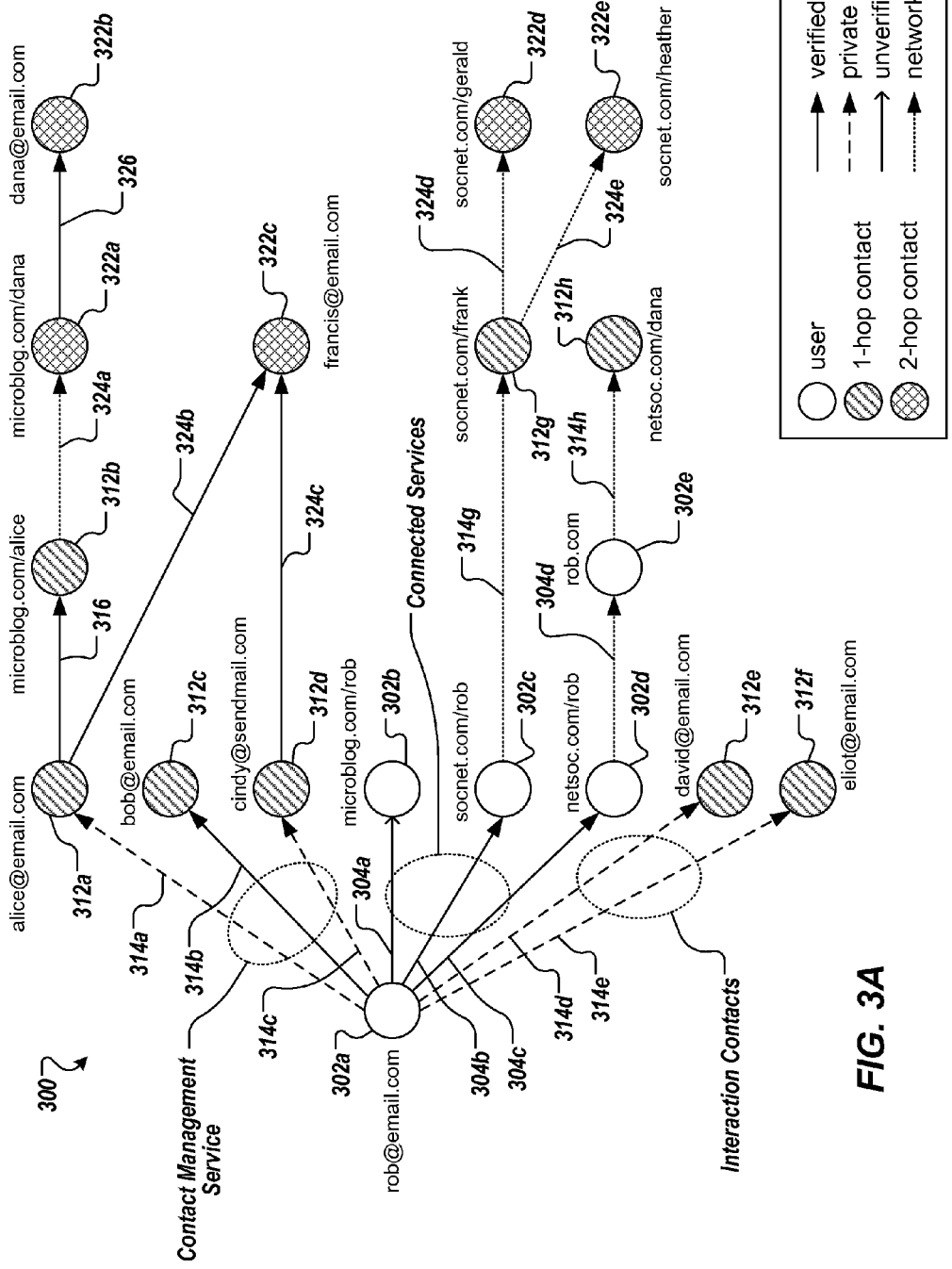
FIG. 3A depicts an example social vicinity graph illustrating an example search depth for a user of the example social networking service discussed with reference to FIGS. 1 and 2.

FIG. 3A depicts an example social vicinity graph 300 illustrating an example search depth for a user of the example social networking service discussed with reference to FIGS. 1 and 2. As discussed in further detail herein, the example social vicinity graph 300 represents a social graph of a subject user and includes nodes and edges between nodes. Each node represents a potential contact and each edge represents a relationship between nodes. Generally, the social vicinity graph 300 is constructed based on data provided from the plurality of data sources (e.g., the first, second and third data sources discussed above).

In the depicted example, a root node 302a corresponds to the subject user and includes a corresponding identifier. In the instant example, the identifier is provided as an email address (rob@email.com) within the context of a first email service. Nodes 302b, 302c, 302d, 302e each correspond to the subject user within respective contexts of respective services that the subject user uses. In the depicted example, the node 302b can correspond to a profile of the subject user within a micro-blogging service, the node 302c can correspond to a profile of the subject user within a first social networking service, the node 302d can correspond to a profile of the subject user within a second social networking service and the node 302e can correspond to a personal website established by the subject user. Accordingly, the node 302a and the nodes 302b, 302c, 302d, 302e can be identified as websites that are connected with the subject user.

An edge 304a represents a relationship between the nodes 302a, 302b. In the depicted example, the edge 304a can be provided as an unverified link. An unverified link can include a suspected link between the nodes that has not yet been confirmed by the subject user. An edge 304b represents a relationship between the nodes 302a, 302c. In the depicted example, the edge 304b can be provided as a verified link between the node 302a and the node 302c. A verified link can include a link between nodes that has been verified by the subject user. For example, when the user establishes a profile with the first social networking service, the first social networking service can request an email address (e.g., rob@email.com) to uniquely identify the subject user. In response to a request to generate the profile, a confirmation email can be sent to the email address. The subject user can confirm the request to generate the profile in response to the confirmation email, thereby establishing the node and the verified link between nodes. An edge 304c represents a relationship between the nodes 302a, 302d. In the depicted example, the edge 304c can be provided as a verified link between the node 302a and the node 302d. An edge 304d represents a relationship between the nodes 302d, 302e. In the depicted example, the edge 304d can be provided as a network link between the node 302d and the node 302e. A network link can include a link between nodes that is represented by a uniform resource locator (URL). For example, the subject user can provide a link (represented by the edge 304d) to the personal website (rob.com) within the second social networking service. The nodes 302b, 302c and 302d can be generated based on data provided from the first data source and/or the third data source, discussed above.

Direct contacts of the subject user are identified as 1-hop contacts. A 1-hop contact is a contact that has some direct interaction with the subject user. In the example of FIG. 3A, the social vicinity graph 300 includes nodes 312a, 312b, 312c, 312d, 312e, 312f, 312g, 312h that correspond to 1-hop contacts of the subject user. The nodes 312a, 312c, 312d, 312e and 312f represent contacts that are direct contacts of the user through a service, and can be generated based on data provided from the first data source, discussed above. In the depicted example, the service includes an email service where the node 312a represents an email contact Alice, the node 312c represents an email contact Bob, the node 312d represents an email contact Cindy, the node 312e represents an email contact David and the node 312f represents an email contact Eliot. Edges 314a, 314b, 314c, 314d, 314e represent links between the root node 302a and the nodes 312a, 312c, 312d, 312e, 312f, respectively. The edges 314a, 314b, 314c, 31d, 314e are provided as private links indicating a non-public relationship between the subject user and the respective contacts (e.g., the subject user Rob and the user Alice email one another, but other contacts might be unaware that Rob and Alice email one another).

The nodes 312g, 312h represent contacts that are direct contacts (i.e., 1-hop contacts) of the user through one or more services, and can be generated based on data provided from the third data source, discussed above. In the depicted example, the services include the first and second social networking services where the node 312g represents a social networking contact Frank and the node 312h represents a social networking contact Dana. Edges 314g, 314h represent links between the node 302c and the node 312g and the node 302e and the node 312h, respectively. The edges 314g, 314h are provided as network links. The edge 314g indicates that the subject user Rob is a direct contact of the contact Frank within the first social networking service. The edge 314h indicates a relationship between the subject user Rob and the contact Dana. In the depicted example, the user Rob can include a link to the contact Dana's profile within the second social networking service on the personal website (rob.com).

The node 312b represents a contact that is a direct contact (i.e., 1-hop contact) of the subject user through a micro-blogging service. In the depicted example, it is determined that the node 312b has a relationship with the email address underlying the node 312a. Consequently, the nodes 312a, 312b are suspected as relating to the same contact and are connected by the edge 316. Suspected nodes can be consolidated (i.e., merged), as discussed in further detail below.

Indirect contacts of the subject user are identified as 2-hop contacts. A 2-hop contact is a contact that includes one degree of separation from the subject user (e.g., a friend-of-a-friend). In the example of FIG. 3A, the social vicinity graph 300 includes nodes 322a, 322c, 322d, 322e that correspond to 2-hop contacts of the subject user. The nodes 322a, 322d, 322e represent contacts that are indirect contacts of the user through a service (e.g., the micro-blogging service, the first social networking service) and can be generated based on data provided from the third data source, discussed above. The node 322c represents a contact that is an indirect contact of the user through a service (e.g., an email service) and can be generated based on data provided from the second data source, discussed above. Edges 324a, 324b, 324c, 324d, 324e represent links between the 1-hop contacts and the 2-hop contacts.

The node 322b represents a contact that is an indirect contact (i.e., 2-hop contact) of the subject user through an email service and a micro-blogging service. In the depicted example, it is determined that the node 322b has a relationship with the micro-blogging profile underlying the node 322a. Consequently, the nodes 322a, 322b are suspected as relating to the same contact and are connected by the edge 326. Suspected nodes can be consolidated (i.e., merged), as discussed in further detail below.

Figure 3B:
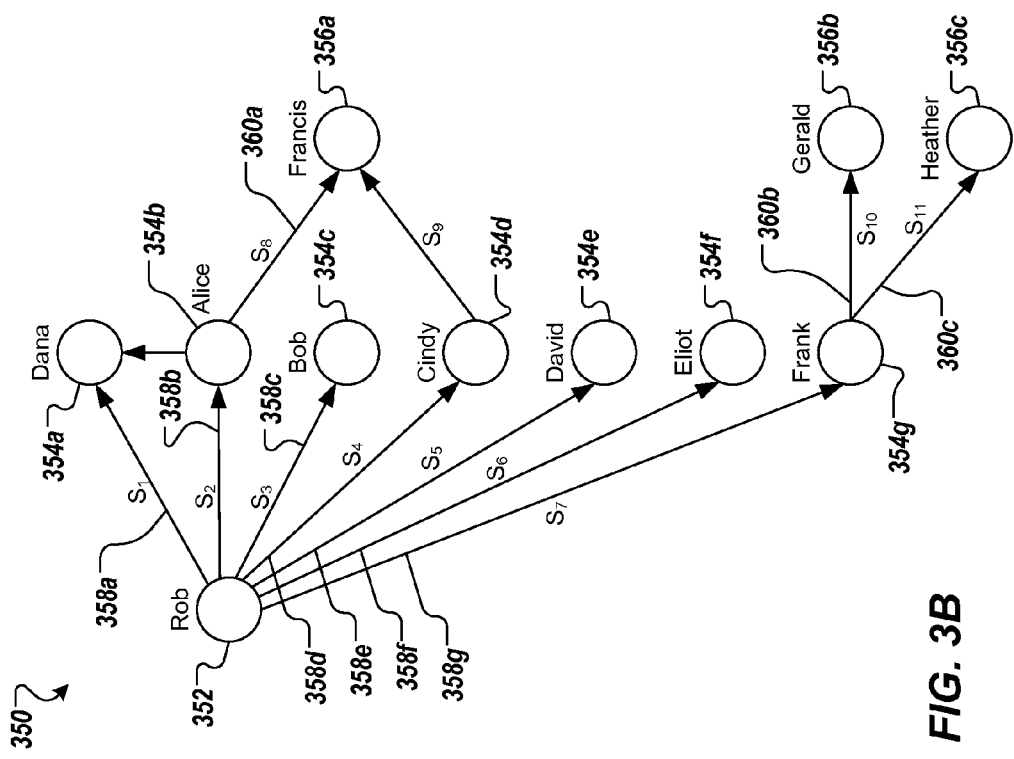
FIG. 3B depicts an example consolidated social vicinity graph representing a consolidated social graph of a subject user.

FIG. 3B depicts an example consolidated social vicinity graph 350 representing a consolidated social graph of a subject user. The directed graph 350 includes nodes and edges between nodes. Each node represents potential contacts of the directed graph 300 and each edge represents a relationship between nodes. The consolidated social vicinity graph 350 of FIG. 3B is based on the social vicinity graph 300 of FIG. 3A, discussed above.

A node 352 represents the subject user. Nodes 354a, 354b, 354c, 354d, 354e, 354f, 354g (collectively referenced as nodes 354a-354g) represent one-hop contacts (i.e., direct contacts) of the subject user. Nodes 356a, 356b, 356c (collectively referenced as nodes 356a-356c) represent two-hop contacts (i.e., contacts-of-contacts) of the subject user. Edges 358a, 358b, 358c, 358d, 358e, 358f, 358g (collectively referenced as nodes 358a-358g) represent relationships between the subject user and the one-hop contacts. Edges 360a, 360b, 360c, 360d (collectively referenced as nodes 360a-360d) represent relationships between the one-hop contacts and the two-hop contacts. In the consolidated social graph 350, the nodes 312a, 312b corresponding to "Alice" have been consolidated (i.e., merged), and the nodes 312h, 322a, 322b corresponding to "Dana" have been consolidated. An edge 362 represents that the contact "Dana" represented by the node 354a is also a two-hop contact of the subject user through the contact "Alice" represented by the node 354b.

In some examples, whether nodes can be consolidated can be determined based on data underlying the nodes. In some examples, a set of candidate identifiers for a contact are identified, for each respective service of a plurality of services that the contact uses (e.g., email service, micro-blogging service): information corresponding to a plurality of the candidate identifiers in the set of candidate identifiers is retrieved, the information is compared with information corresponding to the contact to produce a match result for each respective candidate identifier, and conditionally, in accordance with the match results for the plurality of candidate identifiers, a best matching candidate identifier for the first user is identified. The best matching candidate identifiers for the first user, corresponding to at least a subset of the plurality of online services, are provided for use in consolidation. For example, a contact associated with a node representing a first service can match a contact associated with a node representing a second service. Consequently, the nodes can be consolidated to provide a single node.

Each edge 358a-358g, 360a-360d includes a corresponding social affinity score S1, S2, S3, S4, S5, S6, S7, S8, S9, S10, S11, respectively (collectively referenced as affinity scores S1-S12). Each social affinity score quantifies a social relationship between the subject user and each of the contacts. In some examples, the social affinity scores S1-S12 include interaction scores, discussed above, and are retrieved from a score data source. For example, a request can be sent to the score data source and can include the subject user (Rob) and a respective contact (e.g., Dana). The score data source returns an interaction score (e.g., the affinity score S1) in response to the request.

In some examples, social affinity scores can be adjusted based on a benchmark value equalizing the existence of a number (N) of intermediaries between the user and a 2-hop contact to a theoretical equivalent 1-hop with the same level of interaction (e.g., one outgoing email one day ago). Specifically, a 1-hop contact that the user interacts with (e.g., sends a number of emails) can be equalized with a 2-hop contact that the user has a number of contacts in common with and interacts with (e.g., the user and a 2-hop contact have 10 contacts in common, and the user has interacted with each of the 10 contacts). In this manner, data underlying the 1-hop and the 2-hop contacts is mix such that frequently contacted 1-hop contacts will have higher social affinity scores with the user, quality 2-hop contacts will have the next highest social affinity scores with the user, then everything else (e.g., low quality 1-hop and/or 2-hop contacts) are provided in mix order. In some examples, the mixed order is based on the fact that sometimes many intermediaries trump infrequent communication, and sometimes slightly more frequent communication trumps the number of intermediaries.

An index of potential contacts can be generated based on the consolidated social vicinity graph. In some examples, 1-hop contacts can be provided to the index and can be in rank order based on social affinity score. For example, 1-hop contacts can be provided in decreasing order of social affinity score. In some examples, 2-hop contacts can be provided to the index and can be listed after the 1-hop contacts. The 2-hop contacts can be provided in decreasing order of social affinity score.

In some examples, the social affinity score of each of the 1-hop contacts can be compared to a threshold affinity score ($S_{THR}$) and the 1-hop contacts can be grouped into 1-hop contacts having social affinity scores that are greater than $S_{THR}$ and 1-hop contacts having social affinity scores that are equal to or less than $S_{THR}$. The affinity score of each of the 2-hop contacts can be compared to $S_{THR}$ and the 2-hop contacts can be grouped into 2-hop contacts having social affinity scores that are greater than $S_{THR}$ and 2-hop contacts having social affinity scores that are equal to or less than $S_{THR}$. The 1-hop contacts having social affinity scores that are greater than $S_{THR}$ can be provided at the top of the index in rank order and the 2-hop contacts having social affinity scores that are greater than $S_{THR}$ can be provided next in rank order. The 1-hop and 2-hop contacts having affinity scores that are equal to or less than $S_{THR}$ can be provided next in rank order based on social affinity score.

The contacts provided in the social vicinity index can be displayed to the user as potential contacts within the context of a social networking service (i.e., a social networking service that is different than social networking services used to generate the social vicinity graphs and, ultimately, the index). For example, the social networking service can be a new social networking service that the user has not interacted with before. Referring again to FIG. 2, the contact icons 228a-228j can represent 1-hop and/or 2-hop contacts of a social vicinity index that has been generated based on a social vicinity graph developed for the user "Rob McDavies." The user can add one or more of the contacts represented by the contact icons 228a-228j as contacts within the social networking service. For example, the user can add one or more of the contacts represented by the contact icons 228a-228j to one or more social circles, as discussed above.

Figure 4:
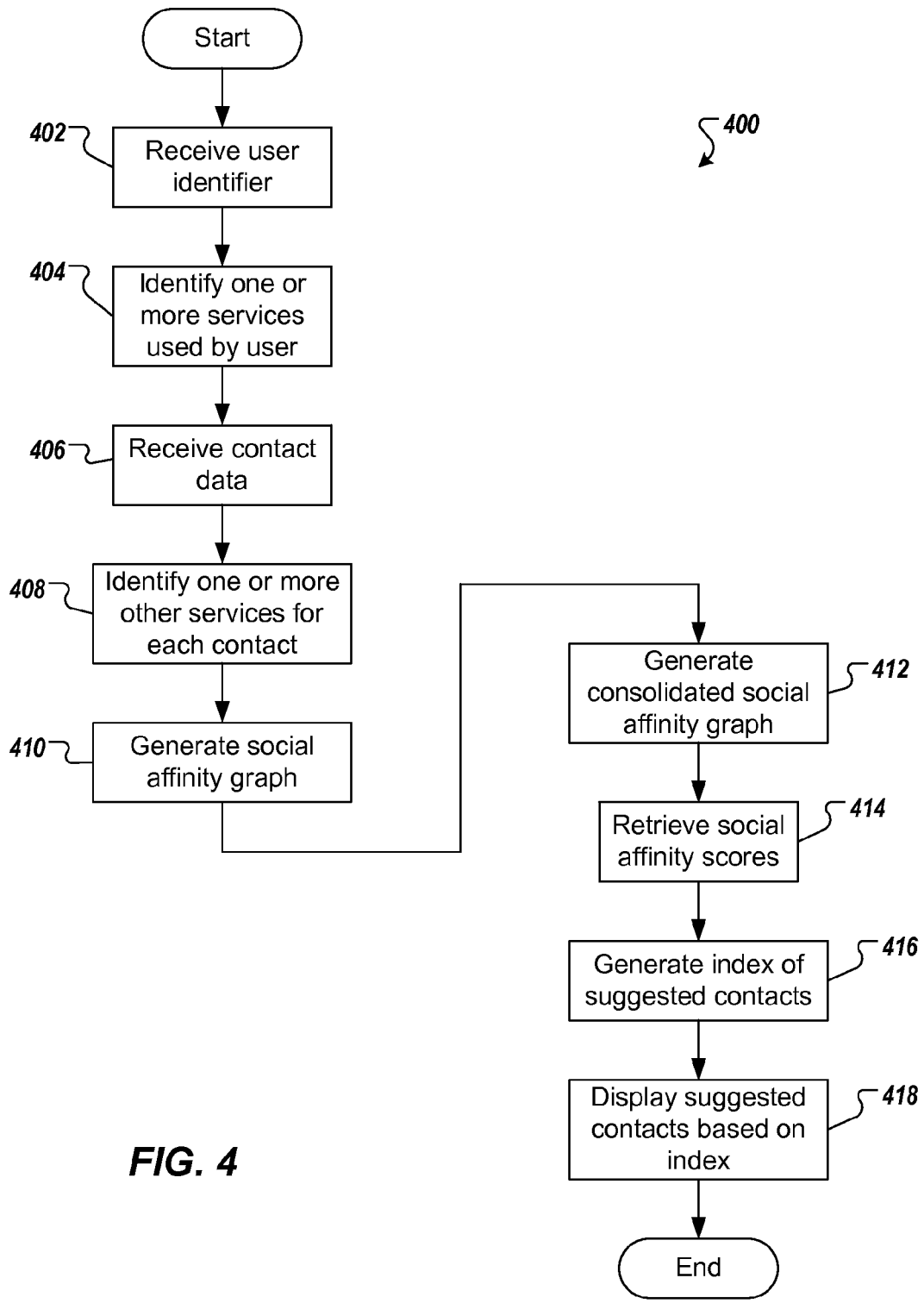
FIG. 4 is a flowchart illustrating an example process for identifying potential contacts for suggestion to a user of a social networking service.

FIG. 4 is a flowchart illustrating an example process 400 for identifying potential contacts for suggestion to a user of a social networking service. The example process 400 can be realized using one or more computer program applications that are executed by one or more computing devices. In some examples, the process 400 is executed for each user of a plurality of users of the social networking service.

A user identifier is received (402). As discussed herein, the user identifier is a unique identifier for the particular user, for which suggested contacts are to be determined. In some examples, the unique identifier includes an email address of the user. In some examples, the unique identifier is based on an email address of the user (e.g., a hash of the email address).

In some implementations, the unique identifier is provided from the first data source, discussed above. In some examples, the first data source can be maintained by a service provider (e.g., an email service provider). In some examples, the service provider also provides the social networking service, for which contacts are to be suggested to the user.

One or more services used by the user are determined (404). In some examples, the one or more services can include an email service, a document sharing service, an IM service, as discussed above. In some implementations, the one or more services are determined based on data provided by the first data source, discussed above. Contact data is received (406). In some examples, the contact data corresponds to contacts of the user that have been established through the one or more services. In some implementations, the contact data is provided from the second data source, discussed above. For each of the contacts, one or more other services used by the contact are identified (408). In some examples, each contact can be identified based on a service used by the user (e.g., an email service), as discussed above. Other services that are used by the contact (e.g., blogging services, micro-blogging services, social networking services) can be identified for the contact. In some implementations, the other services can be identified based on data provided by the third data source, discussed above.

A social affinity graph for the user is generated (410). In some examples, nodes and edges between nodes are generated based on data provided from the first, second and third data sources, discussed above. In some examples, the social affinity graph is provided as a data structure that is stored in electronic memory. A consolidated social affinity graph is generated (412). In some examples, the consolidated social affinity graph is provided as a data structure that is stored in electronic memory. The consolidated social affinity graph can include one or more nodes that each represents two or more nodes of the social affinity graph. For example, the social affinity graph can include a first node that represents a contact within the context of a first service (e.g., an email service) and a second node that represents the contact within the context of a second service (e.g., a micro-blogging service). The consolidated social affinity graph can include a node that represents the contact (i.e., the first node and the second node of the social affinity graph are merged into the node of the consolidated social affinity graph). Each node, besides the root node, in the consolidated social affinity graph corresponds to one of a 1-hop contact and a 2-hop contact of the user.

Social affinity scores are retrieved (414). In some implementations, the social affinity scores are provided from the second data source, discussed above. An index of suggested contacts is generated (416). Suggested contacts are displayed to the user within the context of the social networking service based on the index (418). In some examples, the social affinity graph and the resulting consolidated social vicinity graph are updated as the underlying data changes. In some examples, the update occurs often enough so that the user is shown fresh contact suggestions based on newly available communication history or social vicinity data.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A system comprising:
   a computing device; and
   a non-transitory computer-readable medium coupled to the computing device and having instructions stored thereon which, when executed by the computing device, cause the computing device to perform operations comprising:
   receiving an identifier associated with a user of a social networking service provided by a first service provider;
   identifying, based on the identifier, one or more first services that the user uses, the one or more first services being provided by a second service provider and being different from the social networking service;
   identifying first contacts of the user within each of the one or more first services, one or more contacts of the first contacts being identified based on one or more of a private link and a network link between contacts;
   generating a social vicinity index based on the first contacts, the social vicinity index comprising one or more potential contacts for the user within the social networking service;
   transmitting instructions to display graphical representations of respective potential contacts of the one or more potential contacts to the user in a user interface of the social networking service; and
   receiving a user selection of a potential contact of the one or more potential contacts through the user interface of the social networking service, and in response, providing the potential contact as an actual contact of the user within the social networking service.

2. The system of claim 1, wherein operations further comprise receiving one or more scores, each of the one or more scores being associated with a contact of the first contacts, the social vicinity index being generated further based on the one or more scores.

3. The system of claim 2, wherein each score of the one or more scores comprises a social affinity score reflecting an interaction between the user and a first contact.

4. The system of claim 2, wherein the one or more scores are received from a scoring service.

5. The system of claim 2, wherein each score of the one or more scores is generated based on interactions of the user and the first contacts using the one or more first services.

6. The system of claim 2, wherein operations further comprise:
   defining a group of first contacts, wherein each contact in the group is associated with a score that is greater than a threshold score; and
   populating the social vicinity index with the group, where contacts in the group are provided in a rank order based on score.

7. The system of claim 1, wherein operations further comprise identifying second contacts of the user based on the first contacts, the social vicinity index being generated further based on the second contacts.

8. The system of claim 7, wherein the first contacts are direct contacts of the user within the one or more first services.

9. The system of claim 7, wherein the second contacts are indirect contacts of the user.

10. The system of claim 7, wherein operations further comprise receiving one or more scores, each of the one or more scores being associated with a contact of the first contacts and the second contacts, the social vicinity index being generated further based on the one or more scores.

11. The system of claim 10, wherein operations further comprise:
    defining a first group of contacts, wherein each contact in the first group of contacts is associated with a score that is greater than a threshold score, the first group of contacts comprising contacts of the first contacts and contacts of the second contacts; and
    populating the social vicinity index with the first group of contacts, where contacts in the first group of contacts are provided in a rank order based on score.

12. The system of claim 11, wherein operations further comprise:
    defining a second group of contacts, wherein each contact in the second group of contacts is associated with a score that is less than or equal to the threshold score, the second group of contacts comprising contacts of the first contacts and contacts of the second contacts; and
    populating the social vicinity index with the second group of contacts, where contacts in the second group of contacts are provided in a rank order based on respective quality scores.

13. The system of claim 1, wherein the one or more services comprise at least one of an email service, a document sharing service and an instant messaging (IM) service.

14. The system of claim 1, wherein the identifier is based on an email address of the user.

15. The system of claim 1, wherein operations further comprise:
    receiving user input, the user input indicating that the user has logged into the social networking service; and
    in response to the user input, providing data for displaying graphical representations of each of the one or more potential contacts in a display.

16. The system of claim 1, wherein operations further comprise:
    generating a social vicinity graph based on the user, services used by the user, and contacts of the user; and
    merging data provided in the social vicinity graph to provide a consolidated social vicinity graph, the social vicinity index being generated based on the consolidated social vicinity graph.

17. A non-transitory computer storage medium encoded with a computer program, the program comprising instructions that when executed by one or more computers cause the one or more computers to perform operations comprising:
    receiving an identifier associated with a user of a social networking service, the social networking service being provided using a plurality of computing devices that communicate over a network and being provided by a first service provider;
    identifying, by a computing device of the plurality of computing devices, based on the identifier, one or more first services that the user uses, the one or more first services being provided by a second service provider and being different from the social networking service;
    identifying, by the computing device, first contacts of the user within each of the one or more first services, one or more contacts of the first contacts being identified based on one or more of a private link and a network link between contacts;
    generating, by the computing device, a social vicinity index based on the first contacts, the social vicinity index comprising one or more potential contacts for the user within the social networking service;

storing the social vicinity index in a computer-readable memory;

transmitting instructions to display graphical representations of respective potential contacts of the one or more potential contacts to the user in a user interface of the social networking service; and receiving a user selection of a potential contact of the one or more potential contacts through the user interface of the social networking service, and in response, providing the potential contact as an actual contact of the user within the social networking service.

18. A computer-implemented method comprising:

receiving an identifier associated with a user of a social networking service, the social networking service being provided using a plurality of computing devices that communicate over a network and being provided by a first service provider;

identifying, by a computing device of the plurality of computing devices, based on the identifier, one or more first services that the user uses, the one or more first services being provided by a second service provider and being different from the social networking service;

identifying, by the computing device, first contacts of the user within each of the one or more first services, one or more contacts of the first contacts being identified based on one or more of a private link and a network link between contacts;

generating, by the computing device, a social vicinity index based on the first contacts, the social vicinity index comprising one or more potential contacts for the user within the social networking service;

storing the social vicinity index in a computer-readable memory;

transmitting instructions to display graphical representations of respective potential contacts of the one or more potential contacts to the user in a user interface of the social networking service; and receiving a user selection of a potential contact of the one or more potential contacts through the user interface of the social networking service, and in response, providing the potential contact as an actual contact of the user within the social networking service.

* * * * *